(12) United States Patent
Yamada et al.

(10) Patent No.: US 10,703,941 B2
(45) Date of Patent: Jul. 7, 2020

(54) ELECTRICALLY PEELABLE ADHESIVE COMPOSITION AND ELECTRICALLY PEELABLE PRESSURE SENSITIVE ADHESIVE SHEET, AND METHOD FOR USING ELECTRICALLY PEELABLE PRESSURE SENSITIVE ADHESIVE SHEET

(71) Applicant: LINTEC CORPORATION, Itabashi-ku (JP)

(72) Inventors: Haruya Yamada, Warabi (JP); Kiichiro Kato, Saitama (JP)

(73) Assignee: LINTEC CORPORATION, Itabashi-ku (JP)

( * ) Notice: Subject to any disclaimer, the term of this patent is extended or adjusted under 35 U.S.C. 154(b) by 784 days.

(21) Appl. No.: 14/768,399

(22) PCT Filed: Sep. 26, 2014

(86) PCT No.: PCT/JP2014/075648
§ 371 (c)(1),
(2) Date: Aug. 17, 2015

(87) PCT Pub. No.: WO2015/046433
PCT Pub. Date: Apr. 2, 2015

(65) Prior Publication Data
US 2016/0009962 A1  Jan. 14, 2016

(30) Foreign Application Priority Data

Sep. 27, 2013 (JP) ................. 2013-201280

(51) Int. Cl.
*C09J 133/08* (2006.01)
*C09J 9/00* (2006.01)
(Continued)

(52) U.S. Cl.
CPC ............. *C09J 133/08* (2013.01); *B32B 7/06* (2013.01); *B32B 7/12* (2013.01); *C08F 220/18* (2013.01);
(Continued)

(58) Field of Classification Search
CPC .... C09J 133/08; C09J 133/10; C09J 2433/00; C09J 9/00; C09J 2201/606; C08K 5/16; C08K 5/17
See application file for complete search history.

(56) References Cited

U.S. PATENT DOCUMENTS 5,064,717 A * 11/1991 Suzuki ............... C09D 133/064
427/208
5,908,908 A    6/1999 Vanhoye et al.
(Continued)

FOREIGN PATENT DOCUMENTS

CN      1183446 A    6/1998
CN    102037032 A    4/2011
(Continued)

OTHER PUBLICATIONS

He, Min et al., "Application of Ammonium α-Allyl Alkyl Phenol Polyoxyethylene Ether Sulfonate in Acrylic Emulsion Pressure-Sensitive Adhesive", Polymer-Plastics Technology & Engineering vol. 50, Nov. 2011, pp. 1570-75 (Year: 2011).*
(Continued)

*Primary Examiner* — Scott R. Walshon
(74) *Attorney, Agent, or Firm* — Oblon, McClelland, Maier & Neustadt, L.L.P.

(57) ABSTRACT

An electrically peelable pressure sensitive adhesive sheet has a pressure sensitive adhesive layer formed of an electrically peelable pressure sensitive adhesive composition comprising an acrylic copolymer (A) comprising 1 to 99
(Continued)

mass % of a constituent unit (a1) derived from a compound represented by the following general formula (a1), and a surfactant (B). The electrically peelable pressure sensitive adhesive sheet has high adhesion before voltage application, but the adhesion can be effectively decreased by voltage application for a short time.

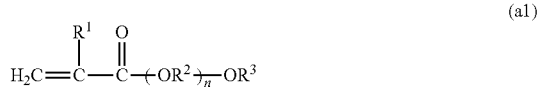

(a1)

wherein $R^1$ represents a hydrogen atom or a methyl group, $R^2$ represents an alkylene group having 1 to 5 carbon atoms that is unsubstituted or has a substituent, and $R^3$ represents an alkyl group having 1 to 8 carbon atoms that is unsubstituted or has a substituent; and a value of n is an integer of 1 or more.

16 Claims, 3 Drawing Sheets

(51) Int. Cl.

| | |
|---|---|
| C08F 220/18 | (2006.01) |
| C08L 71/02 | (2006.01) |
| C09J 133/14 | (2006.01) |
| C08L 63/00 | (2006.01) |
| C09J 7/20 | (2018.01) |
| B32B 7/06 | (2019.01) |
| B32B 7/12 | (2006.01) |
| C09J 5/00 | (2006.01) |

(52) U.S. Cl.
CPC .............. *C08L 63/00* (2013.01); *C08L 71/02* (2013.01); *C09J 5/00* (2013.01); *C09J 7/20* (2018.01); *C09J 9/00* (2013.01); *C09J 133/14* (2013.01); *B32B 2307/202* (2013.01); *B32B 2307/748* (2013.01); *B32B 2405/00* (2013.01); *B32B 2451/00* (2013.01); *C08G 2650/50* (2013.01); *C09J 2201/606* (2013.01); *C09J 2203/31* (2013.01); *C09J 2205/302* (2013.01); *C09J 2433/00* (2013.01); *C09J 2471/00* (2013.01)

(56) References Cited

U.S. PATENT DOCUMENTS

| 6,040,048 | A * | 3/2000 | Kato | ..................... C08F 220/28 |
| | | | | 428/345 |
| 9,040,155 | B2 * | 5/2015 | Ha | .......................... C09J 133/04 |
| | | | | 428/354 |
| 2006/0024494 | A1 | 2/2006 | Amano et al. | |
| 2007/0031660 | A1 * | 2/2007 | Kanamaru | ................ B32B 7/12 |
| | | | | 428/355 AC |
| 2008/0118748 | A1 * | 5/2008 | Griffith | .................. C09J 133/24 |
| | | | | 428/339 |
| 2011/0034624 | A1 | 2/2011 | Tseng et al. | |
| 2013/0005915 | A1 * | 1/2013 | Suzuki | ................... C09J 7/0217 |
| | | | | 525/330.6 |
| 2013/0182324 | A1 * | 7/2013 | Inui | ........................ C09J 133/12 |
| | | | | 359/494.01 |

FOREIGN PATENT DOCUMENTS

| JP | H0539474 | * | 2/1993 | |
| JP | 2003-129030 | A | 5/2003 | |
| JP | 2006-63311 | A | 3/2006 | |
| JP | 2010-1360 | A | 1/2010 | |
| JP | 2010-37354 | A | 2/2010 | |
| JP | 2010-37355 | A | 2/2010 | |
| JP | 2013-163783 | A | 8/2013 | |
| WO | WO 2007/018239 | A1 | 2/2007 | |
| WO | WO-2012039323 | A1 * | 3/2012 | ............ C09J 133/12 |
| WO | WO-2013069907 | A1 * | 5/2013 | |
| WO | WO 2014/157408 | A1 | 10/2014 | |

OTHER PUBLICATIONS

Combined Chinese Office Action and Search Report dated Dec. 13, 2016 in Patent Application No. 201480022405.3 (with English translation of Categories of Cited Documents).
U.S. Appl. No. 14/768,369, filed Aug. 17, 2015, Yamada, et al.
U.S. Appl. No. 14/768,300, filed Aug. 17, 2015, Yamada, et al.
U.S. Appl. No. 14/768,399, filed Aug. 17, 2015, Yamada, et al.
International Search Report dated Dec. 9, 2014, in PCT/JP2014/075648 filed Sep. 26, 23014.

* cited by examiner (a)

(b)

(a)

(b)

ELECTRICALLY PEELABLE ADHESIVE COMPOSITION AND ELECTRICALLY PEELABLE PRESSURE SENSITIVE ADHESIVE SHEET, AND METHOD FOR USING ELECTRICALLY PEELABLE PRESSURE SENSITIVE ADHESIVE SHEET

TECHNICAL FIELD

The present invention relates to an electrically peelable pressure sensitive adhesive composition whose adhesiveness is decreased by applying a voltage, and an electrically peelable pressure sensitive adhesive sheet having a pressure sensitive adhesive layer comprising the pressure sensitive adhesive composition, and a method for using the electrically peelable pressure sensitive adhesive sheet.

BACKGROUND ART

As one of the properties of pressure sensitive adhesive sheets, peelability is required in some cases, for example, in applications such as surface protection films, masking tapes for coating or for decoration, and peelable notes.

When such pressure sensitive adhesive sheets are stuck to adherends, adhesion by which the pressure sensitive adhesive sheets do not peel from the adherends is required during transport, during storage, during processing, and the like. On the other hand, peelability with which the pressure sensitive adhesive sheets can be easily removed after they complete serving their function is required.

As pressure sensitive adhesives used in such pressure sensitive adhesive sheets, electrically peelable pressure sensitive adhesives whose adhesion decreases by applying a voltage are known.

For example, Patent Literature 1 discloses an electrochemically debondable adhesive comprising a high load-resistant bonding polymer having high mechanical strength and comprising an electrolyte.

In addition, Patent Literature 2 discloses an electropeeling composition comprising an ionic liquid as a pressure sensitive adhesive peelable during voltage application. Patent Literature 2 states that the ionic liquid is a molten salt that is a liquid at room temperature, has no vapor pressure, and has properties such as high heat resistance, nonflammability, and high chemical stability.

CITATION LIST

Patent Literature

[PTL 1]
JP-A 2003-129030
[PTL 2]
WO2007/018239

SUMMARY OF INVENTION

Technical Problem

However, when a pressure sensitive adhesive sheet is provided using the adhesive disclosed in Patent Literature 1, a time of about 10 to 15 minutes is required to peel the pressure sensitive adhesive sheet from an adherend, and therefore, the workability is poor.

In addition, the ionic liquid contained in the composition disclosed in Patent Literature 2 is a compound having a special structure as described in the literature and therefore has a high price, and it is difficult to provide an inexpensive pressure sensitive adhesive tape using them. Further, the composition disclosed in Patent Literature 2 still has room for improvement in the decrease rate of adhesion between before and after voltage application.

It is an object of the present invention to provide an electrically peelable pressure sensitive adhesive composition which has high adhesiveness before voltage application but whose adhesiveness can decrease greatly by voltage application for a short time, and an electrically peelable pressure sensitive adhesive sheet having a pressure sensitive adhesive layer comprising the pressure sensitive adhesive composition, and a method for using an electrically peelable pressure sensitive adhesive sheet.

Solution to Problem

The present inventors have found that an electrically peelable pressure sensitive adhesive composition containing an acrylic polymer having a particular structure and a surfactant can solve the above problems, and completed the present invention.

Specifically, the present invention provides the following [1] to [12].
[1] An electrically peelable pressure sensitive adhesive composition comprising an acrylic copolymer (A) comprising 1 to 99 mass % of a constituent unit (a1) derived from a compound represented by the following general formula (a1), and a surfactant (B):

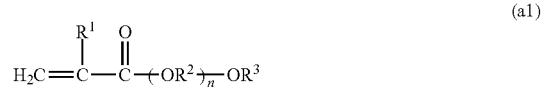

wherein $R^1$ represents a hydrogen atom or a methyl group, $R^2$ represents unsubstituted or substituted alkylene group having 1 to 5 carbon atoms, and $R^3$ represents unsubstituted or substituted alkyl group having 1 to 8 carbon atoms; and n is an integer of 1 or more.
[2] The electrically peelable pressure sensitive adhesive composition according to the above [1], wherein the acrylic copolymer (A) further comprises 0.1 to 30 mass % of a constituent unit (a2) derived from a functional group-containing monomer (a2).
[3] The electrically peelable pressure sensitive adhesive composition according to the above [1] or [2], wherein the acrylic copolymer (A) further comprises 0.1 to 98 mass % of a constituent unit (a3) derived from an alkyl (meth)acrylate (a3) containing an alkyl group having 1 to 20 carbon atoms.
[4] The electrically peelable pressure sensitive adhesive composition according to any one of the above [1] to [3], wherein the compound represented by the general formula (a1) is one or more selected from the group consisting of 2-methoxyethyl (meth)acrylate, 2-methoxyethylene glycol (meth)acrylate, ethoxydiethylene glycol (meth)acrylate, and methoxytriethylene glycol (meth)acrylate.
[5] The electrically peelable pressure sensitive adhesive composition according to any one of the above [1] to [4], wherein the component (B) is a compound represented by the following general formula (b1):

wherein $R^a$ represents any of unsubstituted or substituted alkyl group having 1 to 18 carbon atoms, unsubstituted or substituted cycloalkyl group having 3 to 18 ring carbon atoms, unsubstituted or substituted alkenyl group having 1 to 18 carbon atoms, unsubstituted or substituted cycloalkenyl group having 3 to 18 carbon atoms, and unsubstituted or substituted aryl group having 6 to 24 ring carbon atoms; $R^b$ represents unsubstituted or substituted alkylene group having 1 to 10 carbon atoms; $X^+$ represents a sodium ion or an ammonium ion; and m represents an integer of 1 or more.

[6] The electrically peelable pressure sensitive adhesive composition according to any one of the above [1] to [5], wherein a content of the component (B) is 2.0 to 150 parts by mass based on 100 parts by mass of the component (A).

[7] The electrically peelable pressure sensitive adhesive composition according to any one of the above [1] to [6], further comprising a cross-linking agent (C).

[8] An electrically peelable pressure sensitive adhesive sheet comprising a pressure sensitive adhesive layer formed of the electrically peelable pressure sensitive adhesive composition according to any one of the above [1] to [7].

[9] The electrically peelable pressure sensitive adhesive sheet according to the above [8], comprising the pressure sensitive adhesive layer on at least one face of an electrically conductive substrate.

[10] The electrically peelable pressure sensitive adhesive sheet according to the above [8], having a configuration in which the pressure sensitive adhesive layer is sandwiched between two release sheets.

[11] The electrically peelable pressure sensitive adhesive sheet according to any one of the above [8] to [10], wherein when a voltage is applied between faces on both sides of the pressure sensitive adhesive layer sandwiched between two adherends or an adherend and a substrate, peeling occurs between a face of the pressure sensitive adhesive layer connected to a cathode side and the adherend or the substrate in contact with the face.

[12] A method for using an electrically peelable pressure sensitive adhesive sheet, comprising sticking the electrically peelable pressure sensitive adhesive sheet according to any one of the above [8] to [11] to an adherend having electrical conductivity.

Advantageous Effects of Invention

The electrically peelable pressure sensitive adhesive composition of the present invention has high adhesiveness before voltage application, but the adhesiveness can decrease greatly by voltage application for a short time. Therefore, the electrically peelable pressure sensitive adhesive sheet of the present invention having a pressure sensitive adhesive layer comprising the pressure sensitive adhesive composition has good adhesion and has excellent peelability due to voltage application.

DESCRIPTION OF EMBODIMENTS

Figure 1:
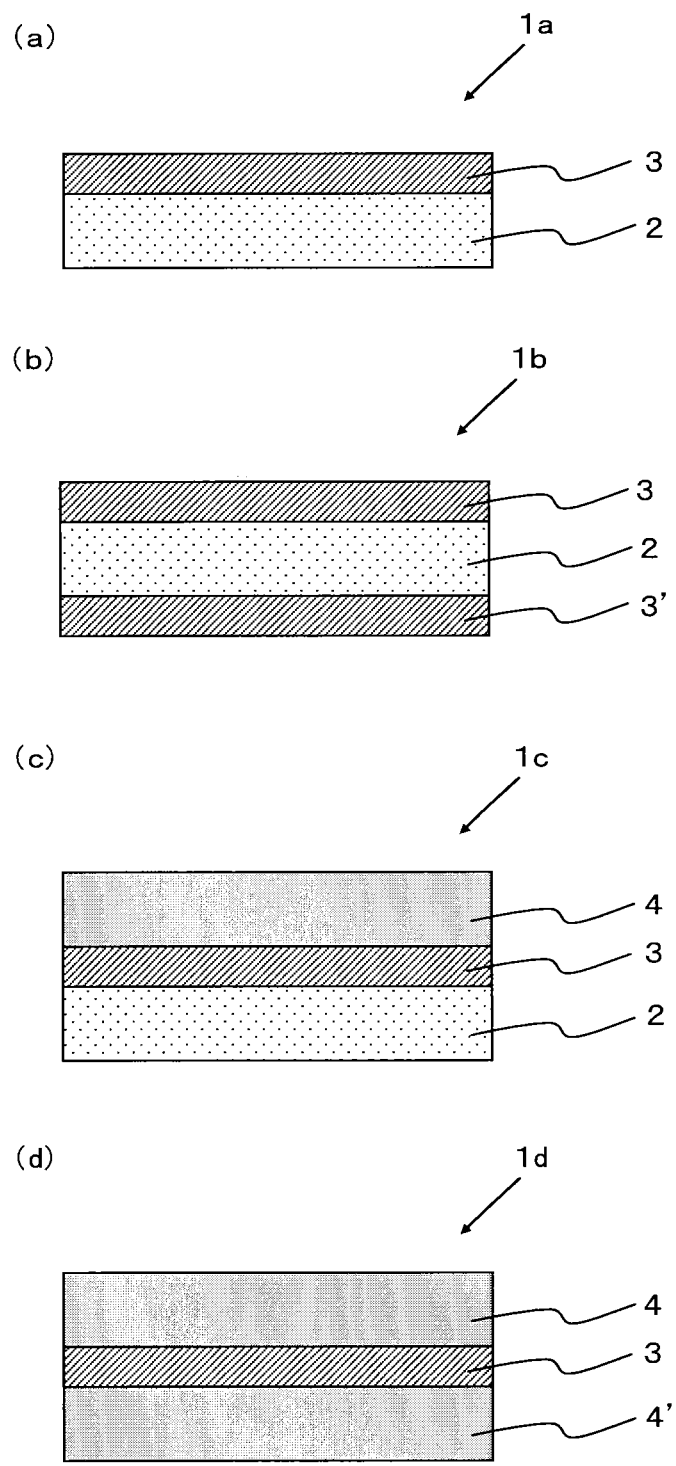
FIG. 1 shows cross-sectional views of the electrically peelable pressure sensitive adhesive sheets of an embodiment of the present invention showing the configurations of the pressure sensitive adhesive sheets.

As used herein, for example, "(meth)acrylic acid" is a term indicating both "acrylic acid" and "methacrylic acid," and a "(poly)alkylene glycol" is used as a term indicating both a "polyalkylene glycol" and an "alkylene glycol." The same applies to other similar terms.

In addition, as used herein, the value of mass average molecular weight (Mw) is a value in terms of standard polystyrene measured by a gel permeation chromatography (GPC) method and is specifically a value measured based on a method described in Examples.

As used herein, "electrical peelability" means the following property: before the application of a voltage, peeling is difficult because of high adhesiveness, but applying a voltage decreases the adhesiveness, by which peeling can occur easily.

Further, as used herein, "unsubstituted" means not being substituted with a substituent and having a hydrogen atom bonded thereto.

[Electrically Peelable Pressure Sensitive Adhesive Composition]

The electrically peelable pressure sensitive adhesive composition (hereinafter also simply referred to as a "pressure sensitive adhesive composition") of the present invention contains an acrylic polymer (A) comprising 1 to 99 mass % of a constituent unit (a1) derived from a compound represented by the following general formula (a1), and a surfactant (B).

(a1)

wherein $R^1$ represents a hydrogen atom or a methyl group, $R^2$ represents an alkylene group having 1 to 5 carbon atoms that is unsubstituted or has a substituent, and $R^3$ represents an alkyl group having 1 to 8 carbon atoms that is unsubstituted or has a substituent; and the value of n is an integer of 1 or more.

The present inventors have found that containing the acrylic polymer (A) comprising a predetermined amount of the above constituent unit (a1) and the surfactant (B) in combination provides a pressure sensitive adhesive composition which has high adhesiveness before voltage application but whose adhesiveness can be greatly decreased by voltage application for a short time.

A pressure sensitive adhesive composition in one aspect of the present invention may contain other components such as a cross-linking agent (C) and a tackifier in addition to the above component (A) and component (B).

<Component (A) Acrylic Polymer>

The acrylic polymer (A) contained in the pressure sensitive adhesive composition of the present invention is a polymer comprising 1 to 99 mass % of the constituent unit (a1) derived from the compound represented by the above general formula (a1) (hereinafter also referred to as "the monomer (a1)").

The acrylic polymer (A) may be a polymer comprising only the constituent unit (a1) but is preferably a copolymer comprising a constituent unit (a2) derived from a functional group-containing monomer (a2) (hereinafter also referred to as "the monomer (a2)") together with the constituent unit (a1).

In addition, the acrylic polymer (A) may be a copolymer further comprising a constituent unit (a3) derived from an alkyl (meth)acrylate having an alkyl group having 1 to 20 carbon atoms (a3) (hereinafter also referred to as "the monomer (a3)"), or a copolymer comprising a constituent unit derived from another monomer other than the above monomers (a1) to (a3).

When the acrylic polymer (A) is a copolymer, the form of copolymerization is not particularly limited, and the copolymer may be any of a random copolymer, a block copolymer, and a graft copolymer.

In the present invention, the acrylic polymer (A) may be used singly, or two or more acrylic polymers (A) may be used in combination.

The mass average molecular weight (Mw) of the acrylic polymer (A) is preferably 100000 to 1500000, more preferably 200000 to 1200000, further preferably 350000 to 1050000, and still further preferably 500000 to 900000 from the viewpoint of adhesiveness improvement.

When the Mw of the component (A) is 100000 or more, the cohesion of the pressure sensitive adhesive composition improves, and good adhesiveness is obtained before voltage application. On the other hand, when the Mw of the component (A) is 1500000 or less, a decrease in adhesiveness due to a too high elastic modulus of the pressure sensitive adhesive layer of a formed pressure sensitive adhesive sheet can be suppressed.

The content of the acrylic polymer (A) is preferably 30 to 99 mass %, more preferably 35 to 98 mass %, and further preferably 40 to 97 mass % based on the total amount (100 mass %) of the pressure sensitive adhesive composition.

(Monomer (a1))

The acrylic polymer (A) is a polymer comprising 1 to 99 mass % of a constituent unit (a1) derived from a compound represented by the following general formula (a1) (monomer (a1)).

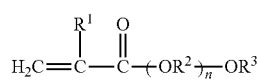

(a1)

In the above formula (a1), IV represents a hydrogen atom or a methyl group.

$R^2$ represents an alkylene group having 1 to 5 carbon atoms that is unsubstituted or has a substituent. An alkylene group having 1 to 3 carbon atoms that is unsubstituted or has a substituent is preferred, an alkylene group having 2 to 3 carbon atoms that is unsubstituted or has a substituent is more preferred, and an ethylene group ($-CH_2CH_2-$) that is unsubstituted or has a substituent is further preferred.

$R^3$ represents an alkyl group having 1 to 8 carbon atoms that is unsubstituted or has a substituent. An alkyl group having 1 to 4 carbon atoms that is unsubstituted or has a substituent is preferred, and a methyl group or an ethyl group that is unsubstituted or has a substituent is more preferred.

The value of n is an integer of 1 or more, preferably an integer of 1 to 10, more preferably an integer of 1 to 5, and further preferably an integer of 1 to 3.

When a plurality of $R^2$ are present, the plurality of $R^2$ may be the same as each other or may be a combination of two or more alkylene groups.

Examples of the above alkylene group having 1 to 5 carbon atoms include linear or branched alkylene groups such as a methylene group, an ethylene group, a n-propylene group, an isopropylene group, a n-butylene group, an isobutylene group, and a n-pentylene group.

Examples of the above alkyl group having 1 to 8 carbon atoms include linear or branched alkyl groups such as a methyl group, an ethyl group, a n-propyl group, an isopropyl group, a n-butyl group, an isobutyl group, a t-butyl group, a pentyl group, a hexyl group, a heptyl group, and an octyl group.

The number of carbon atoms of the alkylene group that can be selected as $R^2$ and the alkyl group that can be selected as $R^3$ does not include the number of carbon atoms of the substituent that the alkylene group and alkyl group may have.

Examples of the substituent that the above alkylene group and alkyl group may have include halogen atoms such as a fluorine atom, a chlorine atom, a bromine atom, and an iodine atom; alkoxy groups having 1 to 6 carbon atoms such as a methoxy group and an ethoxy group; a nitro group; a cyano group; a hydroxyl group; a thiol group; an epoxy group; a glycidoxy group; cycloalkyl groups having 3 to 18 ring carbon atoms such as a cyclopentyl group and a cyclohexyl group; aryl groups having 6 to 18 ring carbon atoms such as a phenyl group and a naphthyl group; and heterocyclic groups having 5 to 18 ring-forming atoms containing any one or more heteroatoms of a nitrogen atom, an oxygen atom, and a sulfur atom, such as a pyridyl group, a furanyl group, and a carbazolyl group. These substituents may be further substituted by the above-described substituent.

As the compound represented by the general formula (a1) (monomer (a1)), one or more selected from 2-methoxyethyl (meth)acrylate, 2-methoxyethylene glycol (meth)acrylate, ethoxydiethylene glycol (meth)acrylate, and methoxytriethylene glycol (meth)acrylate are preferred, and 2-methoxyethyl (meth)acrylate is more preferred, from the viewpoint of obtaining a pressure sensitive adhesive composition whose adhesiveness can be greatly decreased by voltage application for a short time.

These monomers (a1) may be used singly, or two or more of these monomers (a1) may be used in combination.

The content of the constituent unit (a1) derived from the monomer (a1) is 1 to 99 mass %, preferably 5 to 99 mass %, more preferably 10 to 99 mass %, more preferably 20 to 99 mass %, further preferably 30 to 99 mass %, and further preferably 40 to 99 mass % based on all constituent units of the acrylic copolymer (A) (100 mass %) from the viewpoint of obtaining a pressure sensitive adhesive composition which has high adhesiveness before voltage application but whose adhesiveness can be greatly decreased by voltage application for a short time, and is still further preferably 65 to 99 mass % particularly from the viewpoint of further improving the adhesiveness before voltage application.

When the content of the constituent unit (a1) is less than 1 mass %, the extent of decrease in the adhesiveness of the pressure sensitive adhesive composition when a voltage is applied is small, or on the contrary, the adhesiveness improves, and the result is that a pressure sensitive adhesive sheet using the pressure sensitive adhesive composition has poor peelability due to voltage application.

On the other hand, when the content of the constituent unit (a1) is more than 99 mass %, cross-linking bonds cannot be sufficiently formed by a cross-linking reaction described later, and sufficient cohesion is not obtained, and the adhesiveness of the pressure sensitive adhesive composition before voltage application decreases, which is not preferred.
(Monomer (a2))

The acrylic polymer (A) preferably further comprises the constituent unit (a2) derived from the functional group-containing monomer (a2) (monomer (a2)).

The monomer (a2) should be a compound having one or more functional groups in one molecule but is preferably a compound having one or more functional groups and one or more double bonds in one molecule.

The functional group of the monomer (a2) is a cross-linking point of a cross-linking reaction to improve the cohesion, and thus the adhesiveness of the pressure sensitive adhesive composition before voltage application obtained can be further improved.

Examples of the functional group include a carboxy group, a hydroxy group, and an epoxy group.

As the monomer (a2), carboxy group-containing unsaturated monomers, hydroxy group-containing unsaturated monomers, and epoxy group-containing unsaturated monomers, and the like are preferred.

Examples of the carboxy group-containing unsaturated monomers include ethylenic unsaturated monocarboxylic acids such as (meth)acrylic acid and crotonic acid; ethylenic unsaturated dicarboxylic acids such as fumaric acid, itaconic acid, maleic acid, and citraconic acid; and 2-carboxyethyl (meth)acrylate.

Examples of the hydroxy group-containing unsaturated monomers include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, and glycerin di(meth)acrylate.

Examples of the epoxy group-containing unsaturated monomers include glycidyl (meth)acrylate.

These monomers (a2) may be used singly, or two or more of these monomers (a2) may be combined.

Among these, from the viewpoint of versatility, carboxy group-containing unsaturated monomers are preferred, ethylenic unsaturated monocarboxylic acids are more preferred, (meth)acrylic acid is further preferred, and acrylic acid is still further preferred.

When the constituent unit (a2) is contained in the acrylic copolymer (A), the content of the constituent unit (a2) derived from the monomer (a2) is preferably 0.1 to 30 mass %, more preferably 0.4 to 25 mass %, further preferably 1.0 to 15 mass %, and still further preferably 2.0 to 10 mass % based on all constituent units of the acrylic polymer (A) (100 mass %) from the viewpoint of an improvement in the adhesiveness of the pressure sensitive adhesive composition before voltage application.

When the content of the constituent unit (a2) is 0.1 mass % or more, cross-linking bonds can be sufficiently formed by a cross-linking reaction, and the cohesion can be improved, and the adhesion of the pressure sensitive adhesive composition before voltage application can be further improved.

On the other hand, when the content of the constituent unit (a2) is 30 mass % or less, a solution of the pressure sensitive adhesive composition is easily prepared, and an increase in the viscosity of the solution can be suppressed, which is preferred.

(Monomer (a3))

The acrylic polymer (A) may further comprise the constituent unit (a3) derived from the alkyl (meth)acrylate having an alkyl group (a3) (monomer (a3)) containing 1 to 20 carbon atoms.

Examples of the monomer (a3) include methyl (meth)acrylate, ethyl (meth)acrylate, propyl (meth)acrylate, isopropyl (meth)acrylate, butyl (meth)acrylate, pentyl (meth)acrylate, hexyl (meth)acrylate, heptyl (meth)acrylate, 2-ethylhexyl (meth)acrylate, octyl (meth)acrylate, nonyl (meth)acrylate, decyl (meth)acrylate, tridecyl (meth)acrylate, and stearyl (meth)acrylate.

These monomers (a3) may be used singly, or two or more of these monomers (a3) may be used in combination.

Among these, from the viewpoint of an improvement in the adhesion of the pressure sensitive adhesive composition before voltage application, alkyl (meth)acrylates having an alkyl group having 4 to 12 carbon atoms are preferred, and alkyl (meth)acrylates having an alkyl group having 4 to 8 carbon atoms are more preferred.

As a preferred monomer (a3), butyl (meth)acrylate, pentyl (meth)acrylate, hexyl (meth)acrylate, heptyl (meth)acrylate, or 2-ethylhexyl (meth)acrylate is preferred, butyl (meth)acrylate or 2-ethylhexyl (meth)acrylate is preferred, and butyl (meth)acrylate is more preferred.

When the constituent unit (a3) is contained in the acrylic copolymer (A), the content of the constituent unit (a3) derived from the monomer (a3) is preferably 0.1 to 98 mass %, more preferably 1 to 80 mass %, further preferably 5 to 70 mass %, and still further preferably 10 to 60 mass % based on all constituent units of the acrylic polymer (A) (100 mass %) from the viewpoint of an improvement in the adhesiveness of the pressure sensitive adhesive composition before voltage application.

(Another Monomer)

The acrylic polymer (A) used in the present invention may be a copolymer further having a constituent unit derived from another monomer other than the monomers (a1) to (a3).

Examples of the another monomer include olefins such as ethylene, propylene, and isobutylene, halogenated olefins such as vinyl chloride and vinylidene chloride, diene-based monomers such as butadiene, isoprene, and chloroprene, styrene, α-methylstyrene, vinyltoluene, vinyl formate, vinyl acetate, acrylonitrile, (meth)acrylamide, (meth)acrylonitrile, (meth)acryloylmorpholine, and N-vinylpyrrolidone.

These other monomers may be used singly, or two or more of these other monomers may be used in combination.

The total content of the constituent units (a1), (a2), and (a3) is preferably 70 to 100 mass %, more preferably 80 to 100 mass %, further preferably 90 to 100 mass %, and still further preferably 97 to 100 mass % based on all constituent units of the acrylic polymer (A) (100 mass %).

(Method for Synthesizing Acrylic Polymer (A))

The method for synthesizing the acrylic polymer (A) is not particularly limited, and the acrylic polymer (A) can be synthesized in the presence or absence of a solvent by a known polymerization method.

Examples of the solvent used include ethyl acetate and toluene.

In the polymerization reaction, a polymerization initiator may be used. Examples of the polymerization initiator include azobisisobutyronitrile and benzoyl peroxide.

In addition, the polymerization conditions are not particularly limited, but the polymerization is preferably performed under the conditions of a polymerization temperature of 50 to 90° C. and a reaction time of 2 to 30 hours.

<Component (B): Surfactant>

The pressure sensitive adhesive composition of the present invention contains the surfactant (B) together with the above-described acrylic polymer (A).

Examples of the surfactant (B) include anionic surfactants, cationic surfactants, nonionic surfactants, and amphoteric surfactants. From the viewpoint of obtaining a pressure sensitive adhesive composition whose adhesiveness can decrease greatly after voltage application, one or more selected from cationic surfactants, nonionic surfactants, and anionic surfactants are preferred, and anionic surfactants are more preferred.

In the present invention, the component (B) may be used singly, or two or more component (B) s may be used in combination.

The mass average molecular weight (Mw) of the component (B) is preferably 100 to 3000, more preferably 150 to 2500, further preferably 200 to 2000, and still further preferably 300 to 1500.

The content of the component (B) in the pressure sensitive adhesive composition in one aspect of the present invention is preferably 2.0 to 150 parts by mass, more preferably 4.0 to 140 parts by mass, more preferably 6.0 to 130 parts by mass, further preferably 8.0 to 120 parts by mass, further preferably 12 to 110 parts by mass, and still further preferably 15 to 90 parts by mass based on 100 parts by mass of the component (A) from the viewpoint of obtaining a pressure sensitive adhesive composition whose adhesiveness can decrease greatly by voltage application for a short time.

(Anionic Surfactants)

Examples of the anionic surfactants include sulfates of higher alcohols and salts thereof, alkylbenzenesulfonates, polyoxyethylene alkylphenylsulfonates, polyoxyethylene alkyl diphenyl ether sulfonates, alkyl diphenyl ether disulfonates, and dialkyl succinate ester sulfonates.

These anionic surfactants may be used singly, or two or more of these anionic surfactants may be used in combination.

Among the above anionic surfactants, from the viewpoint of obtaining a pressure sensitive adhesive composition whose adhesiveness can decrease greatly after voltage application, polyoxyethylene alkylphenylsulfonates are preferred, and a compound represented by the following general formula (b1) is more preferred.

$$R^aO\text{−}(R^bO)_m\text{−}SO_3^-X^+ \quad (b1)$$

In the above general formula (b1), $R^a$ represents any of an alkyl group having 1 to 18 carbon atoms that is unsubstituted or has a substituent, a cycloalkyl group having 3 to 18 ring carbon atoms that is unsubstituted or has a substituent, an alkenyl group having 1 to 18 carbon atoms that is unsubstituted or has a substituent, a cycloalkenyl group having 3 to 18 ring carbon atoms that is unsubstituted or has a substituent, and an aryl group having 6 to 24 ring carbon atoms that is unsubstituted or has a substituent.

$R^b$ represents an alkylene group having 1 to 10 carbon atoms that is unsubstituted or has a substituent.

$X^+$ represents a sodium ion or an ammonium ion.

m represents an integer of 1 or more, preferably an integer of 1 to 30, more preferably an integer of 1 to 20, and further preferably an integer of 2 to 15.

When a plurality of $R^b$ are present, the plurality of $R^b$ may be the same as each other or may be a combination of two or more alkylene groups.

The number of carbon atoms or the number of ring carbon atoms of the groups that can be selected as $R^a$ and $R^b$ does not include the number of carbon atoms of the substituent that the groups may have.

In addition, examples of the substituent that the groups that can be selected as $R^a$ and $R^b$ may have include halogen atoms such as a fluorine atom, a chlorine atom, a bromine atom, and an iodine atom; alkyl groups having 1 to 6 carbon atoms such as a methyl group and an ethyl group; alkoxy groups having 1 to 6 carbon atoms such as a methoxy group and an ethoxy group; a nitro group; a cyano group; a hydroxyl group; a thiol group; an epoxy group; a glycidoxy group; cycloalkyl groups having 3 to 18 ring carbon atoms such as a cyclopentyl group and a cyclohexyl group; aryl groups having 6 to 18 ring carbon atoms such as a phenyl group and a naphthyl group; and heterocyclic groups having 5 to 18 ring-forming atoms containing any one or more heteroatoms of a nitrogen atom, an oxygen atom, and a sulfur atom, such as a pyridyl group, a furanyl group, and a carbazolyl group.

Examples of the above alkyl group that can be selected as $R^a$ include a nonyl group, a decyl group, an undecyl group, a dodecyl group, a tridecyl group, a tetradecyl group, a pentadecyl group, a hexadecyl group, a heptadecyl group, and an octadecyl group in addition to those illustrated as the alkyl group having 1 to 8 carbon atoms that can be selected as $R^3$ in formula (a1) described above.

The number of carbon atoms of the alkyl group is preferably 1 to 18, more preferably 1 to 12, and further preferably 1 to 6.

Examples of the above cycloalkyl group that can be selected as $R^a$ include a cyclopropyl group, a cyclobutyl group, a cyclopentyl group, a cyclohexyl group, a cycloheptyl group, a cyclooctyl group, and an adamantyl group.

The number of ring carbon atoms of the cycloalkyl group is preferably 3 to 18, more preferably 3 to 12.

Examples of the above alkenyl group that can be selected as $R^a$ include a vinyl group, a propenyl group, a butenyl group, a pentenyl group, a pentadienyl group, a hexenyl group, a hexadienyl group, a heptenyl group, an octenyl group, an octadienyl group, a 2-ethylhexenyl group, and a decenyl group.

The number of carbon atoms of the alkenyl group is preferably 1 to 18, more preferably 1 to 12, and further preferably 1 to 6.

Examples of the above cycloalkenyl group that can be selected as $R^a$ include a cyclopropenyl group, a cyclopentenyl group, a cyclooctenyl group, and a cyclodecenyl group.

The number of ring carbon atoms of the cycloalkenyl group is preferably 3 to 18, more preferably 3 to 12.

Examples of the above aryl group that can be selected as $R^a$ include polycyclic aromatic hydrocarbon groups such as a phenyl group, a biphenyl group, a terphenyl group, a group represented by the following formula (b2), a naphthyl group, an anthryl group, and an anthracenyl group.

The number of carbon atoms of the aryl group is preferably 6 to 24, more preferably 6 to 18.

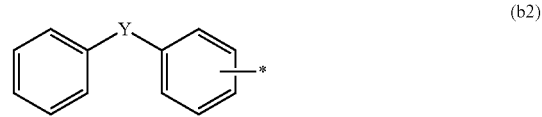

(b2)

In the above formula (b2), Y represents an alkylene group having 1 to 10 carbon atoms, or an oxygen atom, and * represents a bonding moiety. In addition, the benzene rings in formula (b2) are unsubstituted or have a substituent. Examples of the substituent include the same as the substituent that the groups that can be selected as $R^a$ and $R^b$ may have.

Examples of the alkylene group having 1 to 10 carbon atoms include the same as $R^b$ shown below.

Examples of the above alkylene group having 1 to 10 carbon atoms that can be selected as $R^b$ include a methylene group, an ethylene group, a n-propylene group, an isopropylene group, a n-butylene group, an isobutylene group, a n-pentylene group, a n-hexylene group, a n-heptylene group, a n-octylene group, a 2-ethylhexylene group, a n-nonylene group, and a n-decylene group.

The number of carbon atoms of the alkylene group is preferably 1 to 10, more preferably 1 to 6, further preferably 1 to 4, and still further preferably 2 to 3.

As $R^a$ in the above formula (b1), an aryl group that is unsubstituted or has a substituent is preferred, and the group represented by the above formula (b2) or a naphthyl group is more preferred.

In addition, as $R^b$ in the above formula (b1), an ethylene group (—CH$_2$CH$_2$—) or a propylene group (—CH$_2$CH(CH$_3$)—) is preferred, and an ethylene group is more preferred.

When the anionic surfactant is used as the component (B), the content of the anionic surfactant is preferably 2.0 to 150 parts by mass, more preferably 4.0 to 140 parts by mass, more preferably 6.0 to 130 parts by mass, further preferably 8.0 to 120 parts by mass, further preferably 12 to 110 parts by mass, and still further preferably 15 to 90 parts by mass based on 100 parts by mass of the component (A) from the viewpoint of obtaining a pressure sensitive adhesive composition whose adhesiveness can decrease greatly by voltage application for a short time.

(Cationic Surfactants)

Examples of the cationic surfactants include alkylamine hydrochlorides such as laurylamine hydrochloride; and quaternary ammonium salts such as alkylbenzyldimethylammonium salts, alkyltrimethylammonium salts, dialkyldimethylammonium salts, and alkylammonium hydroxides.

These cationic surfactants may be used singly, or two or more of these cationic surfactants may be used in combination.

Among the above cationic surfactants, from the viewpoint of obtaining a pressure sensitive adhesive composition whose adhesiveness can decrease greatly after voltage application, quaternary ammonium salts are preferred, alkylammonium hydroxides are more preferred, and a compound represented by the following general formula (b3) is further preferred.

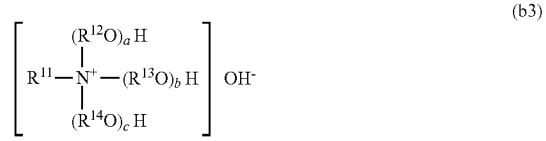

(b3)

In the above general formula (b3), a, b, and c each independently represent an integer of 1 or more, and are each preferably an integer of 1 to 60, and more preferably an integer of 1 to 40.

$R^{11}$ represents an alkyl group that is unsubstituted or has a substituent. The number of carbon atoms of the alkyl group is preferably 1 to 50, more preferably 3 to 30, further preferably 4 to 20, and still further preferably 6 to 15.

$R^{12}$ to $R^{14}$ each independently represent an alkylene group having 1 to 5 carbon atoms that is unsubstituted or has a substituent. An alkylene group having 2 to 4 carbon atoms that is unsubstituted or has a substituent is preferred, an alkylene group having 2 to 3 carbon atoms that is unsubstituted or has a substituent is more preferred, and an ethylene group (—CH$_2$CH$_2$—) that is unsubstituted or has a substituent is further preferred.

Examples of the alkylene group having 1 to 5 carbon atoms include the same as the alkylene group that can be selected as $R^2$ in the above general formula (a1) described above.

When a plurality of $R^{12}$ to $R^{14}$ are each present, the plurality of $R^{12}$ to $R^{14}$ may be the same as each other or may be combinations of two or more alkylene groups.

The number of carbon atoms of the alkyl group that can be selected as $R^{11}$ and the alkylene group that can be selected as $R^{12}$ to $R^{14}$ does not include the number of carbon atoms of the substituent that these groups may have.

In addition, examples of the substituent that the alkyl group or the alkylene group that can be selected as $R^{11}$ to $R^{14}$ may have include the same as the above-described substituent that the groups that can be selected as $R^a$ and $R^b$ in the above general formula (b1) may have.

The pH of the cationic surfactant is preferably 5 to 14, more preferably 7 to 14, and further preferably 9 to 13 from the viewpoint of obtaining a pressure sensitive adhesive composition whose adhesiveness can decrease greatly after voltage application.

When the cationic surfactant is used as the component (B), the content of the cationic surfactant is preferably 2.0 to 150 parts by mass, more preferably 8.0 to 140 parts by mass, more preferably 15 to 130 parts by mass, further preferably 25 to 120 parts by mass, further preferably 30 to 110 parts by mass, and still further preferably 40 to 90 parts by mass based on 100 parts by mass of the component (A) from the viewpoint of obtaining a pressure sensitive adhesive composition whose adhesiveness can decrease greatly by voltage application for a short time.

(Nonionic Surfactants)

Examples of the nonionic surfactants include polyoxyalkylene alkyl aryl ethers such as polyoxyethylene nonyl phenyl ether; polyoxyalkylene alkyl ethers such as polyoxyethylene lauryl ether; polyoxyalkylene alkenyl ethers such as polyoxyethylene oleyl ether; polyoxyalkylene fatty acid esters such as polyethylene glycol monolaurate, polyethylene glycol monostearate, and polyethylene glycol monooleate; polyoxyalkylene sorbitan fatty acid partial esters; polyoxyalkylene sorbitol fatty acid partial esters; polyalkylene glycol fatty acid esters; polyoxyalkylene cured castor oils; polyoxyalkylene glycerin fatty acid partial esters; polyoxyalkylene alkylamines; acetylenediol dipolyoxyalkylene ethers; polyoxyalkylene polystyryl phenyl ethers; polyoxyalkylene polyoxypropylene block polymers; and polyoxyalkylene polyoxypropylene random polymers.

These nonionic surfactants may be used singly, or two or more of these nonionic surfactants may be used in combination.

As the oxyalkylene group of the above nonionic surfactant, oxyalkylene groups having 2 to 4 carbon atoms are preferred, and an oxyethylene group is more preferred.

Among these nonionic surfactants, from the viewpoint of obtaining a pressure sensitive adhesive composition whose adhesiveness can decrease greatly after voltage application, one or more selected from polyoxyalkylene alkyl aryl ethers and polyoxyalkylene alkylamines are preferred, and a compound represented by the following general formula (b4) is more preferred.

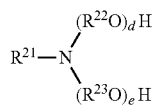

(b4)

In the above general formula (b4), d and e each independently represent an integer of 1 or more, and are each preferably 1 to 60, and more preferably 1 to 40.

$R^{21}$ represents an alkyl group that is unsubstituted or has a substituent, a cycloalkyl group that is unsubstituted or has a substituent, or an aryl group that is unsubstituted or has a substituent.

The number of carbon atoms of the above alkyl group that can be selected as $R^{21}$ is preferably 1 to 30, more preferably 1 to 18, and further preferably 1 to 12.

The number of carbon atoms of the above cycloalkyl group that can be selected as $R^{21}$ is preferably 3 to 30, more preferably 3 to 18, and further preferably 3 to 12.

The number of carbon atoms of the above aryl group that can be selected as $R^{21}$ is preferably 6 to 30, more preferably 6 to 24, and further preferably 6 to 18.

Examples of the alkyl group, the cycloalkyl group, and the aryl group that can be selected as $R^{21}$ include the same as the alkyl group, the cycloalkyl group, and the aryl group that can be selected as $R^3$ in the above general formula (a1) described above.

$R^{22}$ and $R^{23}$ each independently represent an alkylene group having 1 to 5 carbon atoms that is unsubstituted or has a substituent. An alkylene group having 2 to 4 carbon atoms that is unsubstituted or has a substituent is preferred, an alkylene group having 2 to 3 carbon atoms that is unsubstituted or has a substituent is more preferred, and an ethylene group (—CH$_2$CH$_2$—) that is unsubstituted or has a substituent is further preferred.

Examples of the alkylene group having 1 to 5 carbon atoms include the same as the alkylene group that can be selected as $R^2$ in the above general formula (a1) described above.

When a plurality of $R^{22}$ and $R^{23}$ are each present, the plurality of $R^{22}$ and $R^{23}$ may be the same as each other or may be combinations of two or more alkylene groups.

The number of carbon atoms of the alkyl group or the alkylene group that can be selected as $R^{21}$ to $R^{23}$ does not include the number of carbon atoms of the substituent that these groups may have.

In addition, examples of the substituent that the alkyl group or the alkylene group that can be selected as $R^{21}$ to $R^{23}$ may have include the same as the above-described substituent that the groups that can be selected as $R^a$ and $R^b$ in the above general formula (b1) may have.

The HLB value of the nonionic surfactant is preferably 5 to 20, more preferably 7 to 18, further preferably 9 to 16, and still further preferably 10.5 to 14.5 from the viewpoint of obtaining a pressure sensitive adhesive composition whose adhesiveness can decrease greatly after voltage application.

In the present invention, the HLB value is a value calculated by the following calculation formula (1) from a cloudiness number A measured by the following method described in Kaimenkasseizai Binran (Surfactant Handbook) (edited by Ichiro Nishi et al., Sangyo Tosho, published in 1960), page 324.

$$HLB\ value = 0.89 \times A + 1.11 \qquad \text{calculation formula (1)}$$

(Method for Measuring Cloudiness Number A)

0.5 g of an evaluation sample is dissolved in 5 ml of 98 mass % ethyl alcohol, and while the solution is kept at 25° C. and stirred, the solution is titrated with a 2 mass % aqueous solution of phenol. The time when the liquid exhibits turbidity is taken as the end point. The amount in ml of the 2 mass % aqueous solution of phenol required for this titration is taken as the cloudiness number A.

When the nonionic surfactant is used as the component (B), the content of the nonionic surfactant is preferably 2.0 to 150 parts by mass, more preferably 5.0 to 140 parts by mass, more preferably 8.0 to 130 parts by mass, further preferably 25 to 120 parts by mass, further preferably 30 to 110 parts by mass, and still further preferably 40 to 90 parts by mass based on 100 parts by mass of the component (A) from the viewpoint of obtaining a pressure sensitive adhesive composition whose adhesiveness can decrease greatly by voltage application for a short time.

(Amphoteric Surfactants)

Examples of the amphoteric surfactants include betaines such as alkyl betaines, alkylamidopropyl betaines, and 2-alkyl-N-carboxymethyl-N-hydroxyethylimidazolinium betaines; and alkylamine oxides such as alkyldimethylamine oxides.

These amphoteric surfactants may be used singly, or two or more of these amphoteric surfactants may be used in combination.

<Component (C): Cross-Linking Agent>

The pressure sensitive adhesive composition in one aspect of the present invention preferably further contains the cross-linking agent (C) from the viewpoint of improving the cohesion of the pressure sensitive adhesive composition before voltage application.

When the acrylic polymer used as the component (A) comprises the constituent unit (a2) derived from the functional group-containing monomer (a2), compounds that are cross-linked to the functional group are preferred as the cross-linking agent (C) used.

Examples of the specific cross-linking agent (C) include isocyanate-based cross-linking agents, epoxy-based cross-linking agents, oxazoline-based cross-linking agents, carbodiimide-based cross-linking agents, aziridine-based cross-linking agents, polyisocyanate-based cross-linking agents, melamine-based cross-linking agents, metal complex-based cross-linking agents, amine-based cross-linking agents, and hydrazine derivatives such as adipic acid dihydrazide and sebacic acid dihydrazide.

These cross-linking agents may be used singly, or two or more of these cross-linking agents may be used in combination.

Among these, from the viewpoint of improving the cohesion of the pressure sensitive adhesive composition before voltage application, isocyanate-based cross-linking agents or epoxy-based cross-linking agents are preferred.

Examples of the isocyanate-based cross-linking agents include diphenylmethane diisocyanate (MDI), tolylene diisocyanate (TDI), hexamethylene diisocyanate (HDI), isophorone diisocyanate (IPDI), trimethylhexamethylene diisocyanate (TMDI), xylene diisocyanate (XDI), naphthalene diisocyanate (NDI), trimethylolpropane (TMP) adduct TDI, TMP adduct HDI, TMP adduct IPDI, and TMP adduct XDI.

Examples of the epoxy-based cross-linking agents include epoxy resins such as a bisphenol A type, ethylene glycol diglycidyl ether, polyethylene glycol diglycidyl ether, glycerin diglycidyl ether, glycerin triglycidyl ether, 1,6-hexanediol diglycidyl ether, trimethylolpropane triglycidyl ether, N,N-diglycidylaniline, N,N,N',N'-tetraglycidyl meta-xylenediamine, and 1,3-bis(N,N-diglycidylaminomethyl)cyclohexane.

The content of (C) in the pressure sensitive adhesive composition in one aspect of the present invention is preferably 0.001 to 10 parts by mass, more preferably 0.005 to 6 parts by mass, further preferably 0.010 to 4 parts by mass, and still further preferably 0.010 to 2 parts by mass based on 100 parts by mass of the acrylic polymer (A) from the viewpoint of increasing cohesion to moderately improve the cohesion of the pressure sensitive adhesive composition before voltage application.

<Tackifying Resin>

The pressure sensitive adhesive composition in one aspect of the present invention may further contain a tackifying resin in addition to the above components (A) to (C) from the viewpoint of an improvement in the adhesiveness of the pressure sensitive adhesive composition.

As used herein, the "tackifying resin" means a compound in an oligomer class having a number average molecular weight of 100 to 10000 that can be mixed with the above component (A) and the like and has the function of improving the pressure sensitive adhesion performance of the component (A).

Examples of the tackifying resin include rosin-based resins such as rosin resins, rosin phenol resins, and rosin ester resins; hydrogenated rosin-based resins obtained by hydrogenating these rosin-based resins; terpene-based resins such as terpene-based resins, terpene phenol-based resins, and aromatic modified terpene-based resins; hydrogenated terpene-based resins obtained by hydrogenating these terpene-based resins; C5-based petroleum resins obtained by copolymerizing C5 fractions such as pentene, isoprene, piperine, and 1,3-pentadiene produced by the thermal cracking of petroleum naphtha, and hydrogenated petroleum resins of these C5-based petroleum resins; and C9-based petroleum resins obtained by copolymerizing C9 fractions such as indene, vinyltoluene, α-methylstyrene, and β-methylstyrene produced by the thermal cracking of petroleum naphtha, and hydrogenated petroleum resins of these C9-based petroleum resins.

The softening point of the tackifying resin is preferably 60 to 170° C., more preferably 75 to 150° C., further preferably 85 to 140° C., and still further preferably 90 to 130° C. from the viewpoint of an improvement in the adhesion before voltage application. The value of the softening point of the tackifying resin is a value measured according to JIS K 2531.

The content of the tackifying resin is preferably 0 to 150 parts by mass, more preferably 0 to 100 parts by mass, more preferably 0 to 50 parts by mass, further preferably 0 to 20 parts by mass, further preferably 0 to 10 parts by mass, and still further preferably 0 to 4 parts by mass based on 100 parts by mass of the components (A).

<Other Additives>

The pressure sensitive adhesive composition in one aspect of the present invention may contain other additives other than the above as long as the effects of the present invention is not impaired.

Examples of the other additives include antioxidants, ultraviolet absorbing agents, light stabilizers, resin stabilizers, softeners (plasticizers), fillers, rust preventives, pigments, and dyes.

The total content of the above components (A) to (C) in the pressure sensitive adhesive composition in one aspect of the present invention is preferably 60 to 100 mass %, more preferably 70 to 100 mass %, further preferably 80 to 100 mass %, and still further preferably 90 to 100 mass % based on the total amount (100 mass %) of the pressure sensitive adhesive composition.

[Electrically Peelable Pressure Sensitive Adhesive Sheet]

The electrically peelable pressure sensitive adhesive sheet (hereinafter also simply referred to as a "pressure sensitive adhesive sheet") of the present invention has a pressure sensitive adhesive layer formed of the electrically peelable pressure sensitive adhesive composition of the present invention described above.

The configuration of the pressure sensitive adhesive sheet of the present invention is not particularly limited as long as it has a pressure sensitive adhesive layer comprising the pressure sensitive adhesive composition of the present invention. The pressure sensitive adhesive sheet of the present invention may be a pressure sensitive adhesive sheet having a pressure sensitive adhesive layer on at least one face of a substrate, or a pressure sensitive adhesive sheet having a configuration in which a pressure sensitive adhesive layer is sandwiched between two release sheets.

FIG. 1 shows cross-sectional views of electrically peelable pressure sensitive adhesive sheets, which show the configurations of the electrically peelable pressure sensitive adhesive sheet of an embodiment of the present invention.

Examples of specific configurations of the pressure sensitive adhesive sheet of an embodiment of the present invention include a substrate-attached electrically peelable pressure sensitive adhesive sheet 1a having a pressure sensitive adhesive layer 3 on one face of a substrate 2 as shown in FIG. 1 (a).

In addition, examples of specific configurations of the pressure sensitive adhesive sheet in one aspect of the present invention also include a substrate-attached electrically peelable pressure sensitive adhesive sheet 1b having two pressure sensitive adhesive layers 3 and 3' on both faces of a substrate 2 as shown in FIG. 1 (b), and a substrate-attached electrically peelable pressure sensitive adhesive sheet 1c in which a release sheet 4 is further laminated on a pressure sensitive adhesive layer 3 formed on one face of a substrate 2 as shown in FIG. 1 (c). As in the electrically peelable pressure sensitive adhesive sheet 1c, two release sheets may be further laminated on the pressure sensitive adhesive layers 3 and 3' of the electrically peelable pressure sensitive adhesive sheet 1b, respectively.

In addition, the configuration of the pressure sensitive adhesive sheet in one aspect of the present invention may be a substrate-free electrically peelable pressure sensitive adhesive sheet 1d having a configuration in which a pressure sensitive adhesive layer 3 is sandwiched between two release sheets 4 and 4' without using a substrate as shown in FIG. 1 (d).

The release sheets 4 and 4' of this electrically peelable pressure sensitive adhesive sheet 1d may be of the same type or of different types but are preferably adjusted so that the peel strength of the two release sheets 4 and 4' is different.

Other examples of the configuration of the pressure sensitive adhesive sheet in one aspect of the present invention also include an electrically peelable pressure sensitive adhesive sheet having a configuration in which a pressure sensitive adhesive layer provided on one face of a release sheet whose surface is release-treated is rolled in a roll shape.

The adhesion of the pressure sensitive adhesive sheet in one aspect of the present invention before voltage application is preferably 3.0 N/25 mm or more, more preferably 5.0 N/25 mm or more, further preferably 6.5 N/25 mm or more and still further preferably 7.0 N/25 mm or more.

The adhesion of the pressure sensitive adhesive sheet in one aspect of the present invention means a value measured by a method described in Examples.

In the pressure sensitive adhesive sheet in one aspect of the present invention, when a voltage is applied between the faces on both sides of the pressure sensitive adhesive layer sandwiched between two adherends or an adherend and a substrate, the adhesion decreases, and peeling can occur between the face of the pressure sensitive adhesive layer on the positive electrode side or the negative electrode side and the adherend or the substrate stuck to the face.

Which face on the positive electrode side or the negative electrode side the pressure sensitive adhesive layer peels from the adherend or the substrate from is different depending on the types of the constituent units of the acrylic polymer (A) in the pressure sensitive adhesive composition forming the pressure sensitive adhesive layer and the contained compounds.

Figure 2:
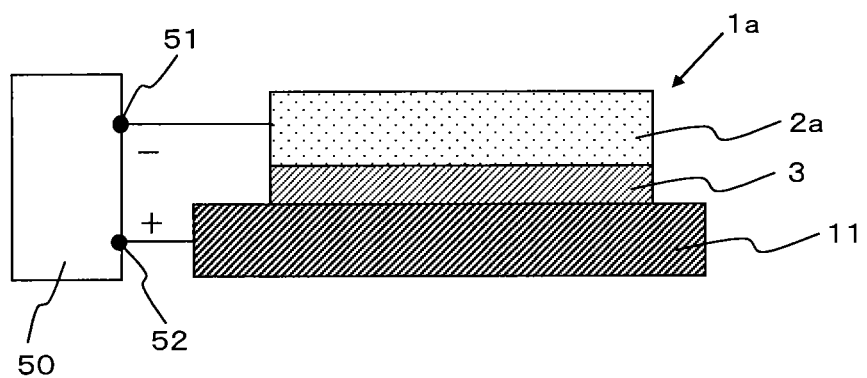
FIG. 2 relates to the electrically peelable pressure sensitive adhesive sheet of an embodiment of the present invention and shows diagrams showing the difference between (a) the pressure sensitive adhesive sheet before voltage application and (b) the pressure sensitive adhesive sheet after voltage application.
Figure 2:
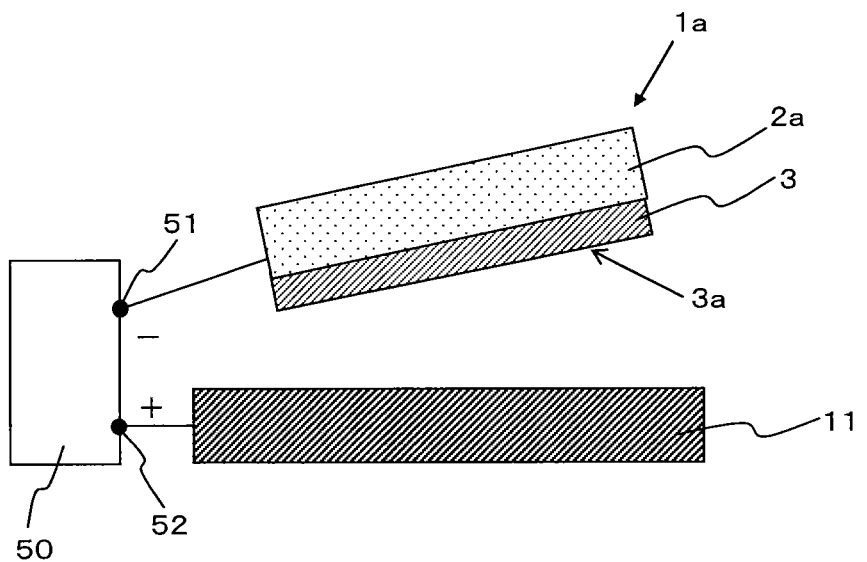
Figure 3:
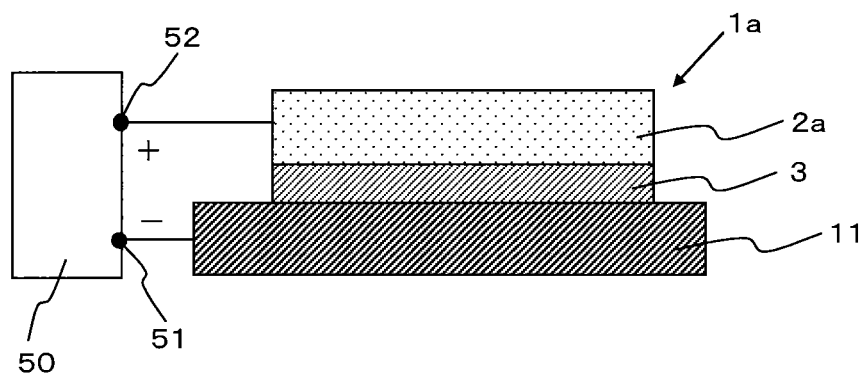
FIG. 3 relates to the electrically peelable pressure sensitive adhesive sheet of an embodiment of the present invention and shows diagrams showing the difference between (a) the pressure sensitive adhesive sheet before voltage application and (b) the pressure sensitive adhesive sheet after voltage application.
Figure 3:
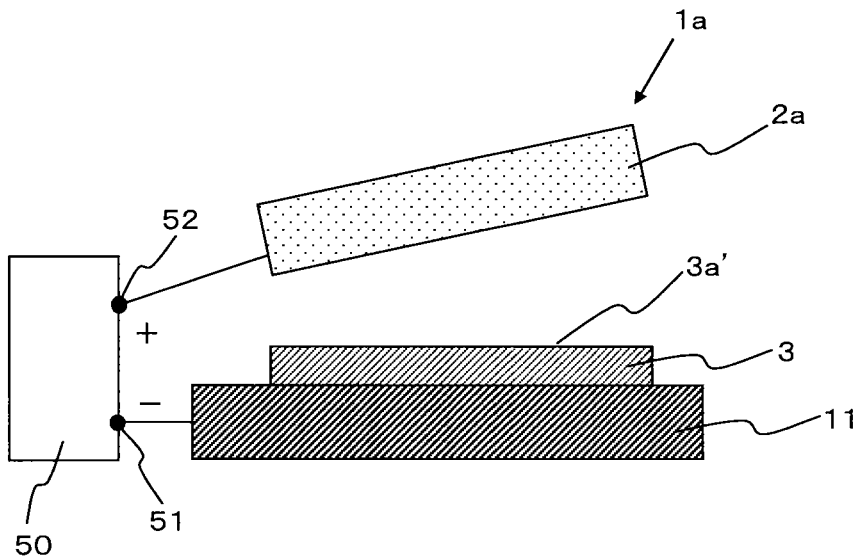

For example, FIG. 2 and FIG. 3 show states in which regarding the electrically peelable pressure sensitive adhesive sheet in one aspect of the present invention, after voltage application, peeling occurs between the face of the pressure sensitive adhesive layer on the positive electrode side and the adherend or the substrate stuck to the face.

FIG. 2 (*a*) shows a state before voltage application. A configuration in which a pressure sensitive adhesive layer 3 is sandwiched between an adherend 11 and a substrate 2*a* is provided. The negative electrode terminal 51 of a voltage application apparatus 50 is connected to the substrate 2*a*, and a positive electrode terminal 52 is connected to the adherend 11.

When a voltage is applied in the state shown in (a) of FIG. 2, the adhesion of the face 3*a* of the pressure sensitive adhesive layer on the positive electrode side decreases, and peeling can occur easily between the face 3*a* of the pressure sensitive adhesive layer and the adherend 11 adhered to the face 3*a*, as shown in (b) of FIG. 2.

When the substrate-free electrically peelable pressure sensitive adhesive sheet 1*d* as shown in (d) of FIG. 1 is used, the configuration of the "substrate 2*a*" in FIG. 2 is another "adherend," and a configuration in which the pressure sensitive adhesive layer 3 is sandwiched between two adherends is provided. Then, by connecting the negative electrode terminal 51 and the positive electrode terminal 52 of the voltage application apparatus 50 to the respective adherends, a voltage can be applied between the faces on both sides of the pressure sensitive adhesive layer 3.

In addition, when the negative electrode terminal and the positive electrode terminal are connected reversely to those of FIG. 2 as shown in (a) of FIG. 3, the adhesion of the face 3*a*' of the pressure sensitive adhesive layer on the positive electrode side decreases, and peeling occurs between the face 3*a*' of the pressure sensitive adhesive layer and the substrate 2*a* adhered to the face 3*a*'.

The voltage applied (applied voltage) is preferably 10 to 200 V, more preferably 40 to 140 V, and further preferably 70 to 120 V, and the time of applying a voltage in the range (application time) is preferably 1 to 180 seconds, more preferably 5 to 120 seconds, and further preferably 10 to 90 seconds.

Generally, the larger the applied voltage is, the shorter the application time is, and on the other hand, the smaller the applied voltage is, the longer the application time is. For example, when the applied voltage is 10 to 50 V, peeling is possible with an application time of 30 to 300 seconds.

In addition, the decrease rate of the adhesion of the pressure sensitive adhesive sheet of an embodiment of the present invention after voltage application is preferably 25% or more, more preferably 50% or more, further preferably 70% or more, and still further preferably 80% or more.

The above "decrease rate of adhesion" is a value calculated by the following formula:

[the decrease rate of adhesion (%)]=100−[the adhesion of the pressure sensitive adhesive sheet after voltage application]/[the adhesion of the pressure sensitive adhesive sheet before voltage application]×100

In addition, the adhesion of the pressure sensitive adhesive sheet in one aspect of the present invention before voltage application is preferably 5.5 N/25 mm or less, more preferably 4.6 N/25 mm or less, further preferably 3.0 N/25 mm or less, and still further preferably 2.0 N/25 mm or less.

The thickness of the pressure sensitive adhesive layer of the pressure sensitive adhesive sheet of an embodiment of the present invention is appropriately adjusted according to the application and the like and is preferably 0.5 to 120 µm, more preferably 1 to 100 µm, and further preferably 3 to 60 µm.

When the thickness of the pressure sensitive adhesive layer is 0.5 µm or more, good adhesion can be exhibited regardless of the type of the adherend. On the other hand, when the thickness of the pressure sensitive adhesive layer is 120 µm or less, an electrically peelable pressure sensitive adhesive sheet that has an advantage in terms of productivity and is also good in terms of handling properties can be provided.

The substrate of the pressure sensitive adhesive sheet of an embodiment of the present invention is preferably an electrically conductive substrate because when it is desired to peel the pressure sensitive adhesive sheet from an adherend, a voltage is applied to the pressure sensitive adhesive layer of the pressure sensitive adhesive sheet.

Examples of the material constituting the electrically conductive substrate include metals such as aluminum, tin-doped indium oxide, copper, iron, silver, platinum, and gold and alloys of these metals.

In addition, a metal-deposited body obtained by depositing the above metal on a film of a resin such as polyethylene terephthalate may be used as the substrate. When a metal is deposited on a resin film, the metal is preferably deposited on the face of the resin film in contact with the pressure sensitive adhesive layer.

The thickness of the substrate is preferably 5 to 300 µm, more preferably 10 to 150 µm, and further preferably 20 to 100 µm.

The release sheet used in the pressure sensitive adhesive sheet of the present invention can be obtained by coating one face or both faces of a release sheet substrate with a release agent.

Examples of the release sheet substrate include films of resins such as polyesters such as polyethylene terephthalate, polybutylene terephthalate, and polyethylene naphthalate, polyethylene, polypropylene, polybutene, polybutadiene, polymethylpentene, polyvinyl chloride, vinyl chloride copolymers, polyurethanes, ethylene-vinyl acetate copolymers, ionomer resins, ethylene (meth)acrylic acid copolymers, polystyrene, polycarbonates, fluororesins, low density polyethylene, linear low density polyethylene, and triacetyl cellulose, substrates of paper such as wood-free paper, coated paper, and glassine paper, and laminated paper obtained by laminating thermoplastic resins such as polyethylene on these paper substrates.

Examples of the release agent used include rubber-based elastomers such as silicone-based resins, olefin-based resins, long chain alkyl-based resins, alkyd-based resins, fluorine-based resins, isoprene-based resins, and butadiene-based resins.

The thickness of the release sheet is not particularly limited but is preferably 5 to 300 μm, more preferably 10 to 200 μm. When a polyethylene terephthalate-based film is used as the release sheet substrate, the thickness of the release sheet is preferably 10 to 100 μm.

[Method for Manufacturing Electrically Peelable Pressure Sensitive Adhesive Sheet]

The method for manufacturing the electrically peelable pressure sensitive adhesive sheet in one aspect of the present invention is not particularly limited. Examples of the method include a method which involves blending an organic solvent such as toluene, ethyl acetate, or methyl ethyl ketone with the pressure sensitive adhesive composition of the present invention to prepare a solution of the pressure sensitive adhesive composition, coating a substrate or the release-treated face of a release sheet with the solution by a known coating method, and drying the solution to form a pressure sensitive adhesive layer to obtain a pressure sensitive adhesive sheet.

The concentration of active ingredient of the solution of the pressure sensitive adhesive composition is preferably 10 to 80 mass %, more preferably 15 to 70 mass %, and further preferably 20 to 65 mass %.

As used herein, "active ingredient" means ingredients excluding a diluent solvent.

Examples of the method for coating the substrate or the release sheet with the solution of the pressure sensitive adhesive composition include a spin coating method, a spray coating method, a bar coating method, a knife coating method, a roll coating method, a blade coating method, a die coating method, and a gravure coating method.

In addition, after a substrate or the release-treated face of a release sheet is coated with a solution obtained by dissolving the pressure sensitive adhesive composition in an organic solvent, in order to prevent the solvent and the low boiling point components from remaining in the formed pressure sensitive adhesive layer, drying treatment is preferably performed to remove these residues.

Examples of specific manufacturing methods classified by the configuration of the electrically peelable pressure sensitive adhesive sheet include the following methods.

First, the electrically peelable pressure sensitive adhesive sheet 1a having the pressure sensitive adhesive layer 3 on one face of the substrate 2 as shown in FIG. 1 (a) can be manufactured, for example, by directly coating one face of the substrate 2 with the solution of the pressure sensitive adhesive composition to form the pressure sensitive adhesive layer 3.

In addition, the electrically peelable pressure sensitive adhesive sheet 1a may be manufactured by directly coating the release-treated face of a release sheet with the solution of the pressure sensitive adhesive composition to form the pressure sensitive adhesive layer 3, then bonding the pressure sensitive adhesive layer 3 and the substrate 2 together, and removing the release sheet.

The electrically peelable pressure sensitive adhesive sheet 1b having the pressure sensitive adhesive layers 3 and 3' on both faces of the substrate 2 as shown in FIG. 1 (b) can be manufactured, for example, by directly coating both faces of the substrate 2 with the solution of the pressure sensitive adhesive composition to form two pressure sensitive adhesive layers 3 and 3'.

In addition, the electrically peelable pressure sensitive adhesive sheet 1b may be manufactured by providing two pressure sensitive adhesive layers each formed by directly coating the release-treated face of a release sheet with the solution of the pressure sensitive adhesive composition, bonding the respective pressure sensitive adhesive layers to both faces of the substrate 2, and removing the release sheets.

The electrically peelable pressure sensitive adhesive sheet 1c having the pressure sensitive adhesive layer 3 and the release sheet 4 in this order on the substrate 2 as shown in FIG. 1 (c) can be manufactured, for example, by laminating the release sheet 4 on the face of the pressure sensitive adhesive layer 3 of the electrically peelable pressure sensitive adhesive sheet 1a obtained as described above.

In addition, the electrically peelable pressure sensitive adhesive sheet 1c may be manufactured by directly coating the release-treated face of the release sheet 4 with the solution of the pressure sensitive adhesive composition to form the pressure sensitive adhesive layer 3, and then bonding the pressure sensitive adhesive layer 3 and the substrate 2 together.

The electrically peelable pressure sensitive adhesive sheet 1d having a configuration in which the pressure sensitive adhesive layer 3 is sandwiched between two release sheets 4 and 4' without using a substrate as shown in FIG. 1 (d) can be fabricated, for example, by directly coating the release-treated face of the release sheet 4 with the solution of the pressure sensitive adhesive composition to form the pressure sensitive adhesive layer 3, and then laminating another release sheet 4' on the face of this pressure sensitive adhesive layer 3.

As described above, the release sheet 4 and the release sheet 4' are preferably adjusted so that the peel strength is different.

[Method for Using Electrically Peelable Pressure Sensitive Adhesive Sheet]

The electrically peelable pressure sensitive adhesive sheet of the present invention can be used by sticking it to any adherend.

The adherend is not particularly limited and may or may not have electrical conductivity but is preferably an adherend having electrical conductivity so that the adherend is an electrode as it is, from the viewpoint that the application of a voltage to the pressure sensitive adhesive faces is easy.

Therefore, from the above viewpoint, the method for using the electrically peelable pressure sensitive adhesive sheet of the present invention is preferably a method of using the pressure sensitive adhesive sheet of the present invention by sticking it to an adherend having electrical conductivity.

Examples of the adherend having electrical conductivity include metals such as aluminum, tin-doped indium oxide, copper, iron, silver, platinum, and gold, alloys of these metals, or the like.

EXAMPLE

The present invention will be specifically described below by the following Examples, but the present invention is not limited to the following Examples.

In addition, for the mass average molecular weight (Mw) of components used in the following Examples, and Comparative Examples, values measured based on the methods below were used.

<Mass Average Molecular Weight (Mw)>

Measurement was performed under the following conditions using a gel permeation chromatograph apparatus (manufactured by Tosoh Corporation, product name "HLC-8020"), and the value measured in terms of standard polystyrene was used.

(Measurement Conditions of Mass Average Molecular Weight (Mw))

Columns: "TSK guard column HXL-H," "TSK gel GMHXL (×2)," and "TSK gel G2000HXL" (all manufactured by Tosoh Corporation)

Column temperature: 40° C.
Developing solvent: tetrahydrofuran
Flow velocity: 1.0 mL/min Examples 1 to 23 and Comparative Examples 1 to 11

Components of types and amounts blended (active ingredient ratio) shown in Table 1 were blended, and toluene was added as an organic solvent for dilution to prepare a coating liquid of an electrically peelable pressure sensitive adhesive composition having 26 mass % concentration of active ingredient. Active ingredient means ingredients other than water and organic solvents contained in a material of interest.

Then, the release-treated face of a release sheet (manufactured by LINTEC Corporation, product name "SP-PET381130," thickness: 38 μm, a polyethylene terephthalate film whose surface was silicone release-treated) was coated with the coating liquid of the electrically peelable pressure sensitive adhesive composition prepared so that the thickness after drying was 50 μm, and the coating liquid was dried at 100° C. for 120 seconds to form a pressure sensitive adhesive layer on the release sheet.

Then, an aluminum foil substrate (manufactured by NIPPON METAL FOIL CO., LTD., product name "Arumitantai S Tsuya 50 Fukuoka," thickness: 50 μm) as a substrate was stuck on the face of the formed pressure sensitive adhesive layer to fabricate an electrically peelable pressure sensitive adhesive sheet of a substrate-attached type having the same configuration as the electrically peelable pressure sensitive adhesive sheet 1c shown in (c) of FIG. 1.

The details of the components (A-1) to (A-5), (B-1) to (B-2), and (C-1) to (C-3) in Table 1 used in the Examples and the Comparative Examples are as follows.

<Acrylic Polymer>

(A-1): An ethyl acetate solution of an acrylic copolymer obtained by polymerizing 45 parts by mass of 2-methoxyethyl acrylate (2MEA), 50 parts by mass of n-butyl acrylate (BA), and 5 parts by mass of acrylic acid (AA) (2MEA/BA/AA=45/50/5 (mass %), Mw=600000, solid concentration=40 mass %).

(A-2): An ethyl acetate solution of an acrylic copolymer obtained by polymerizing 95 parts by mass of 2-methoxyethyl acrylate (2MEA) and 5 parts by mass of acrylic acid (AA) (2MEA/AA=95/5 (mass %), Mw=110000, solid concentration=40 mass %).

(A-3): An ethyl acetate solution of an acrylic copolymer obtained by polymerizing 90 parts by mass of n-butyl acrylate (BA) and 10 parts by mass of acrylic acid (AA) (BA/AA=90/10 (mass %), Mw=600000, solid concentration=33.6 mass %).

(A-4): An ethyl acetate solution of an acrylic copolymer obtained by polymerizing 55 parts by mass of 2-ethylhexyl acrylate (2EHA), 20 parts by mass of n-butyl acrylate (BA), 23 parts by mass of vinyl acetate (VAc), and 2 parts by mass of acrylic acid (AA) (2EHA/BA/VAc/AA=55/20/23/2 (mass %), Mw=1050000, solid concentration=36 mass %).

(A-5): An ethyl acetate solution of an acrylic copolymer obtained by polymerizing 80 parts by mass of 2-ethylhexyl acrylate (2EHA), 16.5 parts by mass of i-butyl acrylate (iBA), 3 parts by mass of acrylic acid (AA), and 0.5 parts by mass of 2-hydroxyethyl acrylate (HEA) (2EHA/iBA/AA/HEA=80/16.5/3/0.5 (mass %), Mw=540000, solid concentration=46 mass %).

When the component (A-5) is used, 10 parts by mass of a rosin-based tackifier and 20 parts by mass of a petroleum-based tackifier are blended based on 100 parts by mass of the component (A-5) (solids).

<Surfactant>

(B-1): An ammonium salt of polyoxyethylene diphenyl ether sulfate represented by the following formula (B-1) (Mw=853, 100 mass % concentration of active ingredient, anionic surfactant).

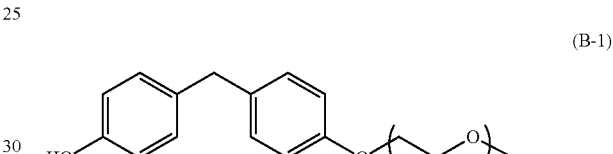

(B-2): A sodium salt of polyoxyethylene diphenyl ether sulfate represented by the following formula (B-2) (Mw=851, 100 mass % concentration of active ingredient, anionic surfactant).

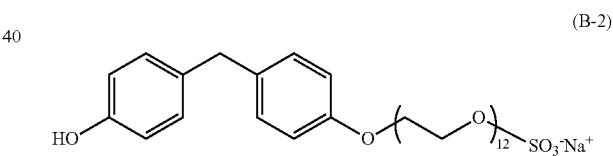

(B-3): An alkylammonium hydroxide represented by the following formula (B-3) (trade name "Texnol L7," manufactured by NIPPON NYUKAZAI CO., LTD., pH=10.5 to 12.5, 100 mass % concentration of active ingredient, cationic surfactant).

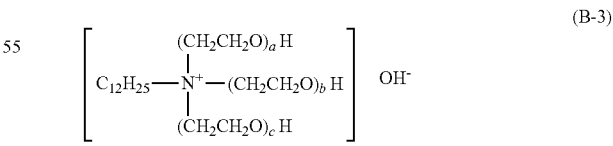

wherein a, b, and c each independently represent a number of 1 or more.

(B-4): A polyoxyethylene alkylamine ether represented by the following formula (B-4) (trade name "Newcol LA-407," manufactured by NIPPON NYUKAZAI CO., LTD., HLB=12.6, 100 mass % concentration of active ingredient, nonionic surfactant).

(B-4)

wherein d and e each independently represent a number of 1 or more; and R represents an alkyl group.

<Cross-Linking Agent>

(C-1); "Koukazai E-AX" (trade name, manufactured by Soken Chemical & Engineering Co., Ltd., epoxy-based cross-linking agent (N,N,N',N'-tetraglycidyl meta-xylenediamine), solid concentration 4.95 mass %).

(C-2); "Koukazai E-14" (trade name, manufactured by Soken Chemical & Engineering Co., Ltd., epoxy-based cross-linking agent, solid concentration 1 mass %).

(C-3); "CORONATE L" (trade name, manufactured by Nippon Polyurethane Industry Co., Ltd., isocyanate-based cross-linking agent, solid concentration 75 mass %).

Using the substrate-attached electrically peelable pressure sensitive adhesive sheets fabricated in the Examples and the Comparative Examples, the adhesion of the pressure sensitive adhesive sheet before and after voltage application was measured according to the following methods. The results are shown in Table 1.

(1) Adhesion of Pressure Sensitive Adhesive Sheet Before Voltage Application

Each of the substrate-attached electrically peelable pressure sensitive adhesive sheets fabricated in the Examples and the Comparative Examples was cut to a size of 25 mm×300 mm, and in an environment of 23° C. and 50% RH (relative humidity), the release sheet was peeled, and the appearing pressure sensitive adhesive layer was stuck to an aluminum plate (manufactured by Paltec Test Panels Co., Ltd., product name "A105OP," 150 mm×70 mm×1 mm), an adherend.

In the sticking, a roller having a weight of 2 kg was reciprocated once to pressure-bond the pressure sensitive adhesive sheet to the adherend. The pressure sensitive adhesive sheet stuck to the adherend was allowed to stand still in an environment of 23° C. and 50% RH (relative humidity) for 24 hours after the sticking to obtain an adhesion measurement sample.

Then, the pressure sensitive adhesive sheet was peeled from an adherend in an environment of 23° C. and 50% RH (relative humidity) under the conditions of a peel rate of 300 ram/min and a peel angle of 180° using a tensile tester (manufactured by ORIENTEC CO., LTD., product name "TENSILON"), and the value (unit: N/25 mm) measured at this time was taken as the adhesion of the pressure sensitive adhesive sheet before voltage application.

(2) Adhesion of Pressure Sensitive Adhesive Sheet after Voltage Application

For the above-described adhesion measurement sample, as shown in (a) of FIG. 2, a voltage application apparatus 50 (manufactured by Takasago Ltd., product name "KH-100H") was used, a negative electrode terminal 51 was connected to an aluminum foil substrate 2a, a positive electrode terminal 52 was connected to an adherend 11, and a voltage of 100 V was applied for 60 seconds.

After the voltage application, the adhesion measurement sample was allowed to stand for 30 seconds. Then, the pressure sensitive adhesive sheet was peeled from an adherend in the same environment of 23° C. and 50% RH (relative humidity) under the conditions of a peel rate of 300 mm/min and a peel angle of 180° using a tensile tester (manufactured by ORIENTEC CO., LTD., trade name "TENSILON"), and the value (unit: N/25 mm) measured at this time was taken as the adhesion of the pressure sensitive adhesive sheet after voltage application.

(3) Adhesion Decrease Rate

The adhesion decrease rate in Table 1 is a value calculated by the following formula. A case where the value is a minus value indicates that the adhesion of the pressure sensitive adhesive sheet increased by voltage application. [the decrease rate of adhesion (%)]=100−[the adhesion of the pressure sensitive adhesive sheet after voltage application]/[the adhesion of the pressure sensitive adhesive sheet before voltage application]×100

TABLE 1

| | Acrylic polymer | | Surfactant | | Cross-linking agent | | | Evaluation items | |
|---|---|---|---|---|---|---|---|---|---|
| | Type | Amount blended (parts by mass*1) | Type | Amount blended (parts by mass*1) | Type | Amount blended (parts by mass*1) | Adhesion (N/25 mm) | Adhesion after voltage application (N/25 mm) | Adhesion decrease rate (%) |
| Example 1 | A-1 | 100.0 | B-1 | 2.5 | C-1 | 0.025 | 6.6 | 4.6 | 30 |
| Example 2 | A-1 | 100.0 | B-1 | 5.0 | C-1 | 0.025 | 6.7 | 1.9 | 72 |
| Example 3 | A-1 | 100.0 | B-1 | 7.5 | C-1 | 0.025 | 7.0 | 1.3 | 82 |
| Example 4 | A-1 | 100.0 | B-1 | 10.0 | C-1 | 0.025 | 7.1 | 1.2 | 84 |
| Example 5 | A-1 | 100.0 | B-1 | 20.0 | C-1 | 0.025 | 6.9 | 0.9 | 88 |
| Example 6 | A-1 | 100.0 | B-1 | 50.0 | C-1 | 0.025 | 7.0 | 1.1 | 84 |
| Example 7 | A-1 | 100.0 | B-1 | 100.0 | C-1 | 0.025 | 7.1 | 1.6 | 78 |
| Example 8 | A-1 | 100.0 | B-2 | 5.0 | C-1 | 0.025 | 7.4 | 1.6 | 78 |
| Example 9 | A-1 | 100.0 | B-2 | 10.0 | C-1 | 0.025 | 7.4 | 2.1 | 72 |
| Example 10 | A-1 | 100.0 | B-2 | 20.0 | C-1 | 0.025 | 7.8 | 1.9 | 75 |
| Example 11 | A-2 | 100.0 | B-1 | 6.7 | C-2 | 0.01 | 9.4 | 4.3 | 54 |
| Example 12 | A-2 | 100.0 | B-1 | 10.0 | C-2 | 0.01 | 9.6 | 2.8 | 71 |
| Example 13 | A-2 | 100.0 | B-1 | 20.0 | C-2 | 0.01 | 11.0 | 1.6 | 86 |
| Example 14 | A-2 | 100.0 | B-1 | 40.0 | C-2 | 0.01 | 10.4 | 0.9 | 91 |
| Example 15 | A-2 | 100.0 | B-1 | 50.0 | C-2 | 0.01 | 10.3 | 1.2 | 89 |
| Example 16 | A-2 | 100.0 | B-1 | 67.0 | C-2 | 0.01 | 10.2 | 1.2 | 88 |
| Example 17 | A-2 | 100.0 | B-1 | 100.0 | C-2 | 0.01 | 7.6 | 0.5 | 93 |
| Example 18 | A-1 | 100.0 | B-3 | 10.0 | C-1 | 0.062 | 7.5 | 5.0 | 33 |
| Example 19 | A-1 | 100.0 | B-3 | 20.0 | C-1 | 0.062 | 7.0 | 4.8 | 31 |
| Example 20 | A-1 | 100.0 | B-3 | 50.0 | C-1 | 0.062 | 5.9 | 0.1 | 98 |
| Example 21 | A-1 | 100.0 | B-4 | 10.0 | C-1 | 0.062 | 7.8 | 4.9 | 37 |

TABLE 1-continued

|  | Acrylic polymer | | Surfactant | | Cross-linking agent | | Adhesion (N/25 mm) | Evaluation items | |
|---|---|---|---|---|---|---|---|---|---|
|  | | | | | | | | Adhesion after voltage application (N/25 mm) | Adhesion decrease rate (%) |
|  | Type | Amount blended (parts by mass*1) | Type | Amount blended (parts by mass*1) | Type | Amount blended (parts by mass*1) | | | |
| Example 22 | A-1 | 100.0 | B-4 | 20.0 | C-1 | 0.062 | 7.2 | 5.1 | 29 |
| Example 23 | A-1 | 100.0 | B-4 | 50.0 | C-1 | 0.062 | 8.0 | 0.7 | 91 |
| Comparative Example 1 | A-1 | 100.0 | B-1 | 0.0 | C-1 | 0.025 | 6.9 | 6.2 | 10 |
| Comparative Example 2 | A-2 | 100.0 | B-1 | 0.0 | C-2 | 0.01 | 8.5 | 8.6 | 0 |
| Comparative Example 3 | A-3 | 100.0 | B-1 | 0.0 | C-3 | 0.75 | 4.4 | 5.4 | −23 |
| Comparative Example 4 | A-3 | 100.0 | B-1 | 10.0 | C-3 | 0.75 | 4.8 | 6.6 | −38 |
| Comparative Example 5 | A-3 | 100.0 | B-1 | 20.0 | C-3 | 0.75 | 5.7 | 5.3 | 8 |
| Comparative Example 6 | A-4 | 100.0 | B-1 | 0.0 | — | — | 4.6 | 5.0 | −9 |
| Comparative Example 7 | A-4 | 100.0 | B-1 | 10.0 | — | — | 6.8 | 6.5 | 4 |
| Comparative Example 8 | A-4 | 100.0 | B-1 | 20.0 | — | — | 5.1 | 4.3 | 16 |
| Comparative Example 9 | A-5 | 100.0 | B-1 | 0.0 | C-3 | 1.69 | 10.3 | 10.6 | −2 |
| Comparative Example 10 | A-5 | 100.0 | B-1 | 8.7 | C-3 | 1.69 | 13.0 | 13.3 | −2 |
| Comparative Example 11 | A-5 | 100.0 | B-1 | 17.4 | C-3 | 1.69 | 13.3 | 12.3 | 8 |

*1Parts by mass indicates an active ingredient ratio

According to Table 1, it is seen that the electrically peelable pressure sensitive adhesive sheets of Examples 1 to 23 have low adhesion after voltage application and a high decrease rate of adhesion due to voltage application. In addition, it was confirmed that for the electrically peelable pressure sensitive adhesive sheets of Examples 1 to 23, as shown in (b) of FIG. 2, after voltage application, the pressure sensitive adhesive layer 3 was peeled from the adherend 11 side connected to the positive electrode terminal 52.

On the other hand, the result was that for the electrically peelable pressure sensitive adhesive sheets of Comparative Examples 1 to 11, compared with the Examples, the adhesion after voltage application was high, and the extent of decrease in adhesion before and after voltage application was small, or on the contrary, the adhesion increased.

INDUSTRIAL APPLICABILITY

The electrically peelable pressure sensitive adhesive sheet of the present invention has good adhesion and has excellent peelability due to voltage application. Therefore, the electrically peelable pressure sensitive adhesive sheet of the present invention is preferred, for example, as applications where peelability is required such as surface protection films, masking tapes for coating or for decoration, and peelable notes.

REFERENCE SIGNS LIST 1a, 1b, 1c, 1d electrically peelable pressure sensitive adhesive sheet
2 substrate
2a aluminum foil substrate
3, 3' pressure sensitive adhesive layer
3a, 3a' face of pressure sensitive adhesive layer on positive electrode side
4, 4' release sheet
11 adherend
50 voltage application apparatus
51 negative electrode terminal
52 positive electrode terminal

The invention claimed is:

1. An electrically peelable pressure sensitive adhesive composition, comprising:
an acrylic copolymer (A) comprising 10 to 99 mass % of a constituent unit (a1) derived from a compound of the formula (a1); and
a surfactant (B), which is a compound of the formula (b1),

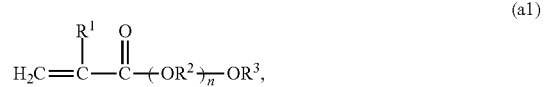

(a1)

wherein $R^1$ represents a hydrogen atom or a methyl group, $R^2$ represents unsubstituted or substituted alkylene group having 1 to 5 carbon atoms, and $R^3$ represents unsubstituted or substituted alkyl group having 1 to 8 carbon atoms; and n is an integer 1 or more, $$R^aO(R^bO)_mSO_3^-X^+ \quad (b1),$$

wherein $R^a$ represents any of unsubstituted or substituted alkyl group having 1 to 18 carbon atoms, unsubstituted or substituted cycloalkyl group having 3 to 18 ring carbon atoms, unsubstituted or substituted alkenyl group having 1 to 18 carbon atoms, unsubstituted or substituted cycloalkenyl group having 3 to 18 carbon atoms, and unsubstituted or substituted aryl group having 6 to 24 ring carbon atoms; $R^b$ represents unsubstituted or substituted alkylene group having 1 to 10 carbon atoms; $X^+$ represents an ammonium ion; and m represents an integer of 1 or more,
wherein the content of the surfactant (B) is 40 to 90 parts by mass based on 100 parts by mass of the acrylic copolymer (A).

2. The electrically peelable pressure sensitive adhesive composition according to claim 1, wherein the acrylic copolymer (A) further comprises 0.1 to 30 mass % of a constituent unit (a2) derived from a functional group-containing monomer (a2).

3. The electrically peelable pressure sensitive adhesive composition according to claim 2, wherein the acrylic copolymer (A) further comprises 1 to 80 mass % of a constituent unit (a3) derived from an alkyl (meth)acrylate (a3) containing an alkyl group having 1 to 20 carbon atoms.

4. The electrically peelable pressure sensitive adhesive composition according to claim 1, wherein the acrylic copolymer (A) further comprises 1 to 80 mass % of a constituent unit (a3) derived from an alkyl (meth)acrylate (a3) containing an alkyl group having 1 to 20 carbon atoms.

5. The electrically peelable pressure sensitive adhesive composition according to claim 1, wherein the compound of the formula (a1) is at least one selected from the group consisting of 2-methoxyethyl (meth)acrylate, 2-methoxyethylene glycol (meth)acrylate, ethoxydiethylene glycol (meth)acrylate, and methoxytriethylene glycol (meth)acrylate.

6. The electrically peelable pressure sensitive adhesive composition according to claim 1, wherein in the formula (b1), m is an integer of 2 to 15.

7. The electrically peelable pressure sensitive adhesive composition according to claim 1, wherein the content of the surfactant (B) is 67 to 90 parts by mass based on 100 parts by mass of the acrylic copolymer (A).

8. The electrically peelable pressure sensitive adhesive composition according to claim 1, further comprising a cross-linking agent (C).

9. An electrically peelable pressure sensitive adhesive sheet, comprising:
a pressure sensitive adhesive layer formed from the electrically peelable pressure sensitive adhesive composition according to claim 1.

10. The electrically peelable pressure sensitive adhesive sheet according to claim 9, further comprising:
an electrically conductive substrate,
wherein the pressure sensitive adhesive layer is on at least one face of the electrically conductive substrate.

11. The electrically peelable pressure sensitive adhesive sheet according to claim 9, further comprising:
a pair of release sheets,
wherein the pressure sensitive adhesive layer is sandwiched between the release sheets.

12. The electrically peelable pressure sensitive adhesive sheet according to claim 9, wherein when a voltage is applied between faces on both sides of the pressure sensitive adhesive layer sandwiched between two adherends or an adherend and a substrate, peeling occurs between a face of the pressure sensitive adhesive layer connected to a cathode side and the adherend or the substrate in contact with the face.

13. The electrically peelable pressure sensitive adhesive composition according to claim 1, wherein the acrylic copolymer (A) comprises 20 to 99 mass % of the constituent unit (a1) derived from the compound of the formula (a1).

14. The electrically peelable pressure sensitive adhesive composition according to claim 1, wherein the content of the surfactant (B) is 50 to 90 parts by mass based on 100 parts by mass of the acrylic copolymer (A).

15. An electrically peelable pressure sensitive adhesive composition, comprising:
an acrylic copolymer (A) comprising 10 to 99 mass % of a constituent unit (a1) derived from a compound of the formula (a1); and
a surfactant (B), which is a compound of the formula (b1),

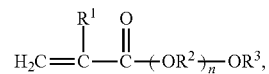
(a1)

wherein $R^1$ represents a hydrogen atom or a methyl group, $R^2$ represents unsubstituted or substituted alkylene group having 1 to 5 carbon atoms, and $R^3$ represents unsubstituted or substituted alkyl group having 1 to 8 carbon atoms; and n is an integer 1 or more,

(b1), wherein $R^a$ represents any of unsubstituted or substituted alkyl group having 1 to 18 carbon atoms, unsubstituted or substituted cycloalkyl group having 3 to 18 ring carbon atoms, unsubstituted or substituted alkenyl group having 1 to 18 carbon atoms, unsubstituted or substituted cycloalkenyl group having 3 to 18 carbon atoms, and unsubstituted or substituted aryl group having 6 to 24 ring carbon atoms; $R^b$ represents unsubstituted or substituted alkylene group having 1 to 10 carbon atoms; $X^+$ represents an ammonium ion; and m represents an integer of 1 or more,
wherein the content of the surfactant (B) is 40 to 130 parts by mass based on 100 parts by mass of the acrylic copolymer (A).

16. A method, comprising:
sticking the electrically peelable pressure sensitive adhesive sheet according to claim 9 to an adherend having electrical conductivity.

* * * * *